S. N. MILLIVEE.
Churn.
No. 205,887.     Patented July 9, 1878.
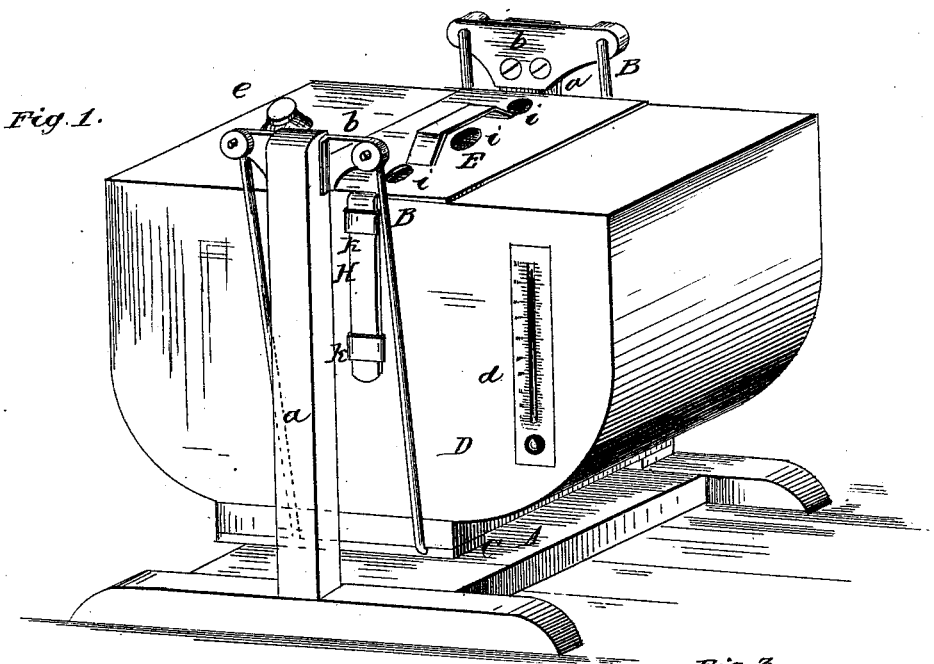
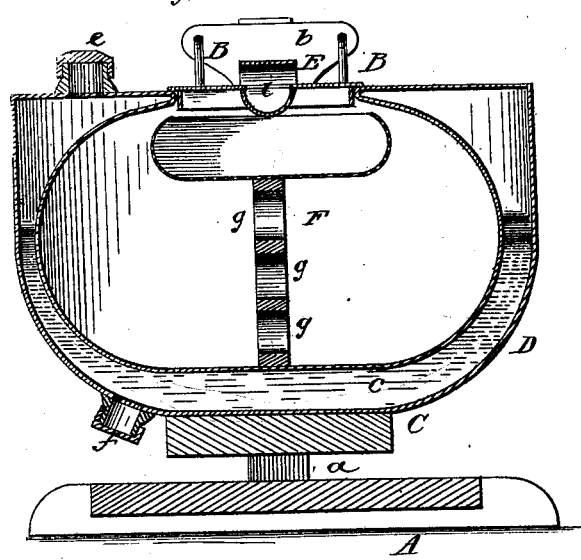
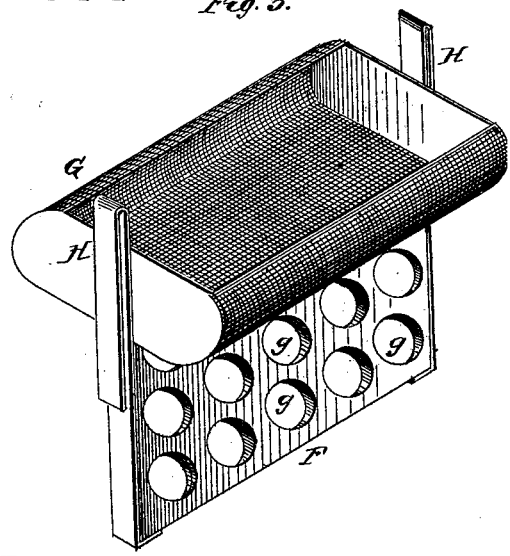
Witnesses
Fred G. Dietrich
Jno. P. Brooks
Inventor
Samuel N. Millivee
pr. C. A. Snow & Co.
attys.

UNITED STATES PATENT OFFICE.

SAMUEL N. MILLIVEE, OF KNOXVILLE, TENNESSEE, ASSIGNOR OF ONE-HALF HIS RIGHT TO HORACE FOSTER, OF SAME PLACE.

IMPROVEMENT IN CHURNS.

Specification forming part of Letters Patent No. 205,887, dated July 9, 1878; application filed March 25, 1878.

*To all whom it may concern:*

Be it known that I, SAMUEL N. MILLIVEE, of Knoxville, in the county of Knox and State of Tennessee, have invented certain new and useful Improvements in Churns; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view. Fig. 2 is a longitudinal vertical section, and Fig. 3 is a perspective view of the dasher and butter-gatherer detached.

Similar letters of reference denote corresponding parts in all the figures.

My invention relates to that class of churns in which the box or body is suspended so as to be easily vibrated or oscillated, the cream being by such movement forced forward and backward through perforations in the dasher, which latter is stationary; and it consists, essentially, in the construction and arrangement of an improved dasher and butter-gatherer, as I shall now proceed more fully to describe with reference to the drawings hereto annexed, in which—

A is a frame, consisting mainly of two suitably supported uprights, $a$ $a$, having at their upper ends cross-pieces $b$ $b$, at the ends of which are pivoted bails B B, connected by a bottom piece, C.

Upon the board C, I secure the churn D. This consists of a box, made preferably of sheet metal, and having a double bottom, forming a space, $c$, in which hot or cold water may be placed, according to the season, to regulate the temperature of the cream.

In the side of the churn-box I arrange a thermometer, $d$, by which the temperature of the cream may at any time be ascertained.

Openings $e$ $f$, provided with suitable plugs or covers, are provided for the ingress and egress of water.

The churn-box is provided with a detachable cover, E, having suitable vent-holes $i$ $i$, and in the box is arranged the dasher, which consists of a board, F, having perforations $g$ $g$. Secured on the top of the dasher-board is a trough, G, made preferably of perforated sheet metal, and having inwardly-curved sides. The dasher and trough G are secured to the churn-box by metallic bails or strips H H, passing through loops $k$ $k$ on the outside of the box.

In operation, the churn-box is vibrated or swung to and fro upon its supporting-bails B B. By so doing the cream which has been previously placed in the box is forced through the perforations in the dasher-board, being thus effectually cut. A part of the cream is each time thrown up into the trough G, through the perforations of which it is strained, leaving only the globules of butter, which are thus collected and gradually worked together by the motion of the churn.

Having thus described my invention, I claim and desire to secure by Letters Patent of the United States—

1. In a vibratory churn, the combination of the dasher with the butter-gatherer formed of a perforated trough having inwardly-curved sides, substantially as described, for the purpose herein shown and specified.

2. The combination of the frame A, bails B B, swinging churn-box D, having double bottom, dasher F, and butter-gatherer G, all combined, arranged, and operating substantially as described, for the purpose herein set forth.

In testimony that I claim the foregoing as my own I have hereto affixed my signature in presence of two witnesses.

SAMUEL N. MILLIVEE.

Witnesses:
NAPOLEON GUINN,
SADOC HEDGE.